United States Patent [19]

Nemoto et al.

[11] Patent Number: 4,750,064
[45] Date of Patent: Jun. 7, 1988

[54] FLEXIBLE MAGNETIC DISC APPARATUS

[75] Inventors: Tsuneo Nemoto; Kazuo Sasaki, both of Miyagi, Japan

[73] Assignee: Sony Corporation, Tokyo, Japan

[21] Appl. No.: 934,805

[22] Filed: Nov. 25, 1986

[30] Foreign Application Priority Data

Dec. 6, 1985 [JP] Japan .......................... 60-188043[U]

[51] Int. Cl.⁴ ...................... G11B 5/016; G11B 23/033
[52] U.S. Cl. ........................................ 360/99; 360/133
[58] Field of Search ....................... 360/99, 97, 98, 133

[56] References Cited

U.S. PATENT DOCUMENTS 4,573,093  2/1986  Obama et al. .......................... 360/99
4,590,532  5/1986  Saito ....................................... 360/99

FOREIGN PATENT DOCUMENTS 58-169381  10/1983  Japan .................................... 360/133

Primary Examiner—John H. Wolff
Assistant Examiner—Matthew Bussan
Attorney, Agent, or Firm—Alvin Sinderbrand

[57] ABSTRACT

In a flexible magnetic disc apparatus having a disc drive unit including a spindle with a cylindrical peripheral surface terminating at an upper margin thereof and a seating surface provided on the disc drive unit in a plane normal to the central rotary axis of the cylindrical peripheral surface, and a record disc including a flexible magnetic disc member, a reinforcing core member secured to the disc member at the center thereof and having an aperture for receiving the spindle and a reference surface engageable with the seating surface to limit the extension of the spindle through the aperture, spindle positioning projections extending into the aperture for engagement with the spindle therein and a resilient member extending into the aperture for pressing the spindle therein against the positioning projections; the top edges of the spindle positioning projections are located in respect to the reference surface so that, when the record disc is mounted on the disc drive unit with the reference surface engaging the seating surface, the cylindrical peripheral surface of the spindle always extends above the top edges of the positioning projections, not withstanding the standard dimensional tolerances, for ensuring that the positioning projections will accurately center the flexible magnetic disc member relative to the rotary axis.

4 Claims, 3 Drawing Sheets

FLEXIBLE MAGNETIC DISC APPARATUS

BACKGROUND OF THE INVENTION

1. Field of the Invention

This invention relates generally to a flexible magnetic disc apparatus adapted to be used in an electronic still camera for recording on a flexible magnetic disc a information signals representing a still picture or image.

2. Description of the Prior Art

It has been earlier proposed to provide a flexible magnetic disc apparatus in which a flexible magnetic disc is adapted for the magnetic recording thereon of information signals, for example, representing still images, and which is contained in a protective jacket for convenience in handling and storage. In such apparatus, it is necessary that, when the flexible magnetic disc is loaded into a magnetic recording and/or reproducing apparatus included in an electronic still camera, the center of rotation of the flexible magnetic disc in the protective jacket will be precisely coincident with the axis of the driving shaft or spindle included in the disc drive unit of the magnetic recording and/or reproducing apparatus.

With the foregoing in view, it has been proposed, for example, as disclosed specifically in Japanese Laid-Open Publication No. 195674/1982 (Japanese patent application No. 82831/1981), which has a common assignee with the present application, to provide the flexible magnetic disc with a reinforcing core member secured to the disc at the center of the latter. Such reinforcing core member is formed with an aperture for receiving the driving shaft or spindle of the disc drive unit and having positioning projections defining surfaces against which the spindle is resiliently urged for making the center of rotation of the magnetic disc coincident with the axis of the spindle.

The reinforcing core member applied to the flexible magnetic disc in the above identified Laid-Open Publication is molded of a synthetic resin material and the aperture for receiving the spindle and the positioning projections extending into the aperture are molded simultaneously with the remainder of the core member. Of course, the mold used for forming the core member has a configuration corresponding to the latter, and thus is provided with a protruberant portion corresponding to the spindle receiving aperture of the molded core member. Since the positioning projections for engagement with the spindle need to be formed within the spindle receiving aperture, the mold for forming the core member is divided into an upper mold half and a lower mold half with the parting surface therebetween extending along top edges of the spindle positioning projections. The upper and lower mold halves are provided with protuberant portions that abut when molding the core member so as to form the spindle receiving aperture. As is well known, such protuberant portions of the upper and lower mold halves need to be tapered or increased in diameter in the directions toward the respective openings of the aperture to be defined thereby in order to ensure that the protuberant portions of the mold halves can be extracted from the aperture of the core member molded thereby. Of course, the operative surfaces of the positioning projections, that is, the surfaces thereof engageable with the spindle, are similarly tapered or inclined and, as a result, the spindle receiving aperture has different effective diameters at the upper and lower edges of the positioning projections. The magnetic disc apparatus disclosed in the previously identified laid-open publication is designed with the intention that a cylindrical peripheral surface of the driving shaft or spindle will engage the positioning projections at the upper edges of the latter, that is, where the aperture has the smallest effective diameter, and where the axis of the spindle will be coincident with the center of rotation of the magnetic disc attached to the reinforcing core member.

Although the height of the driving shaft or spindle is standardized, the pertinent standards specify predetermined dimensional tolerances for the manufacture of the driving shaft or spindle and for the other components of the flexible magnetic disc apparatus. It has been found that, within such dimensional tolerances, the upper margin of the cylindrical peripheral surface of the spindle may be positioned below the top edges of the positioning projections of the core member of a flexible magnetic disc mounted on the disc drive unit. In that case, the spindle will engage the tapered operative surfaces of the positioning projections below the top edges of the latter, that is, at a level where the effective diameter of the spindle receiving aperture is larger than the diameter for achieving precise centering of the magnetic disc in respect to the axis of the spindle or driving shaft.

OBJECTS AND SUMMARY OF THE INVENTION

Accordingly, it is an object of the invention to provide a flexible magnetic disc apparatus which ensures that, when a record disc is mounted on a disc drive unit, the flexible magnetic disc member of the record disc will be reliably and accurately centered in respect to the axis of rotation of the spindle or driving shaft.

Another object of this invention is to provide a flexible magnetic disc apparatus, as aforesaid, in which accurate positioning of the flexible magnetic disc relative to the driving shaft or spindle is maintained over the full range of dimensional changes permitted by the standard tolerances therefor.

In accordance with an aspect of this invention, in a flexible magnetic disc apparatus having a disc drive unit including a spindle with a cylindrical peripheral surface terminating at an upper margin thereof and a seating surface provided on the disc unit in a plane normal to the center rotary axis of the cylindrical peripheral surface, and a record disc including a flexible magnetic disc member, a core member secured to the disc member at the center of the latter and having an aperture for receiving the spindle and means defining a reference surface engageable with the seating surface to limit the extension of the spindle through the aperture, and centering means associated with the core member including spindle positioning projections extending into the aperture for engagement with the spindle therein and a resilient member extending into the aperture for pressing the spindle therein against the positioning projections; top edges of the positioning projections are located in respect to the reference surface so that, when the record disc is mounted on the disc drive unit with the reference surface engaging the seating surface, the cylindrical peripheral surface of the spindle always extends above the top edges of the positioning projections, not withstanding the standard dimensional tolerances, for ensuring that the positioning projections accurately center the flexible magnetic disc member relative to the rotary axis.

More specifically, it is a feature of the invention, to provide the upper margin of the cylindrical peripheral surface of the spindle at least a predetermined minimum distance above the plane of the seating surface under all conditions within the dimensional tolerances specified by the relevant standards, while the top edges of the spindle positioning projections are at a distance above the reference surface that is substantially smaller than said predetermined minimum distance from the plane of the seating surface to the upper margin of the cylindrical peripheral surface on the spindle.

The above, and other objects, features and advantages of the invention, will be apparent in the following detailed description of an illustrative embodiment which is to be read in connection with the accompanying drawings in which corresponding parts are identified by the same reference numerals in the several views.

DESCRIPTION OF A PREFERRED EMBODIMENT

Figure 1:
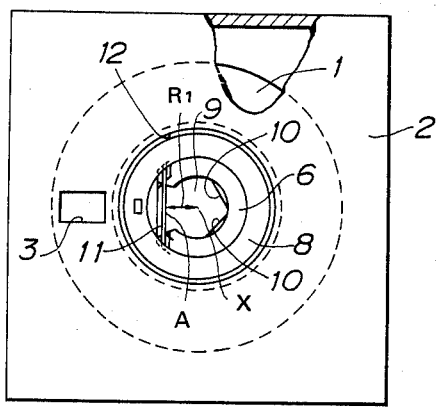
FIG. 1 is a plan view showing a flexible magnetic disc apparatus of a type previously proposed by the present applicants, and to which the present invention is advantageously applied.

Referring to the drawings in detail, and initially to FIG. 1 thereof, it will be seen that a flexible magnetic disc apparatus of the type to which the present invention is desirably applied comprises a flexible magnetic disc 1 rotatably contained within a protective jacket 2 which prevents dust and dirt from adhering to the surfaces of flexible magnetic disc 1. Magnetic signals, for example, representing still image information, may be recorded in, or reproduced from a large number of concentric recording tracks (not shown) on the surface of disc 1 by means of one or more magnetic heads (not shown) provided in a magnetic recording and/or reproducing apparatus forming part of, for example, and electronic still camera, and which have access to the surface of disc 1 through an access opening 3 formed in jacket 2.

At the center of the flexible magnetic disc 1, there is a circular opening 5 (FIG. 2) for receiving a reinforcing core member 6. Such core member 6 is formed by so-called outsert casting or molding of a synthetic resin material onto a circular metal yoke 7 which defines a flange surface extending radially outward from core member 6 and at which a radially inner annular portion of disc 1 is adhered to core member 6, as by a suitable adhesive or double-sided adhesive tapes between yoke 7 and disc 1. An annular retainer 8 engages over core member 6 at the side of flexible magnetic disc 1 opposite from yoke 7, and such annular retainer 8 is suitably secured to core member 6, as by ultrasonic welding.

At approximately the center of core member 6, there is provided an aperture 9 for receiving a spindle 4 of a disc drive unit. Spindle positioning projections 10 extend into aperture 9 and have inner or operative surfaces that converge toward each other (FIG. 1), and that are intended to engage a cylindrical peripheral surface 4a on spindle 4 for the purpose of making the center of magnetic disc 1 coincident with the axis of rotation of spindle 4. At the side of aperture 9 opposed to that at which positioning projections 10 are situated, a plate spring 11 extends chordally across aperture 9 and has its end portions received in mounting slots. Plate spring 11 is retained in such mounting slots by retainer ring 8 which is provided for that purpose. As shown on FIG. 1, the distance $R_1$ from the center A of the inner surface 11a of plate spring 11, in the normal or unstressed condition of the spring, to the center of rotation X of the magnetic disc 1 is made to be smaller than the radius R of spindle 4 at the cylindrical peripheral surface 4a of the latter. Therefore, when spindle 4 is inserted into aperture 9, plate spring 11 is flexed and, at its inner or thrusting surface 11a, acts against the cylindrical peripheral surface 4a of the spindle for urging or pressing the latter against the active or operative surfaces of positioning projections 10.

Figure 2:
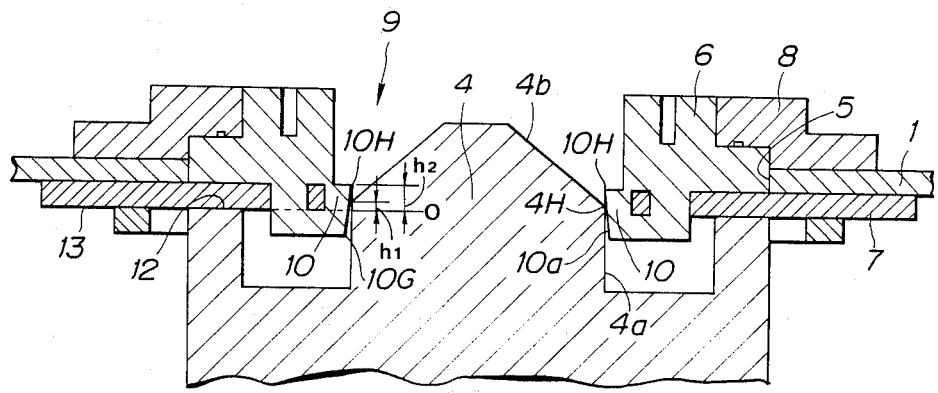
FIG. 2 is an enlarged sectional view showing essential parts of the flexible magnetic disc apparatus of FIG. 1 when mounted on the spindle of a disc drive unit.

As earlier noted, the central core member 6 is formed by so-called outsert casting or molding of a synthetic resin material into a mold in which the circular metal yoke 7 is accommodated. During such molding, the positioning projections 10 are molded as integral parts of core member 6 so as to extend into aperture 9 of the latter. Of course, the mold used for forming core member 6 has a configuration corresponding to the latter, and thus is provided with a protuberant portion corresponding to aperture 9 of core member 6. Since positioning projections 10 for engagement with spindle 4 when the latter is received in aperture 9 are formed integrally with the remainder of core member 6, the mold for forming core member 6 is divided into an upper mold half and a lower mold half with the parting surface therebetween extending along the top edges 10H of spindle positioning projections 10 (FIG. 2). The protuberant portion of the mold for defining aperture 9 is, of course, divided into protuberant parts of the upper and lower mold halves, respectively, that abut at the parting surface when the mold is closed for forming core member 6. In order that the molded core member 6 can be removed from the mold, the latter is provided with draft, that is, the protuberant parts of the upper and lower mold halves are tapered or increased in diameter in the directions toward the respective openings of the aperture 9. In other words, the protuberant parts of the upper and lower mold halves decrease in diameter in the directions toward the parting surface between the mold halves in order to ensure that such protuberant parts of the mold halves can be extracted from the aperture 9 of core member 6 molded thereby. Of course, the operative surfaces 10a (FIG. 2) of spindle positioning projections 10 are similarly tapered or inclined for removal from the mold so that such operative surfaces 10a define an effective diameter within aperture 9 that is smaller at the top edges 10H of projections 10 than at the bottom edges 10G of the latter.

In the previously proposed flexible magnetic disc apparatus, positioning projections 10 are dimensioned in respect to the diameter of spindle 4 at its cylindrical peripheral surface 4a so that the rotational axis of spindle 4 and the center of flexible magnetic disc 1 will precisely coincide with each other when cylindrical peripheral surface 4a of the spindle engages operative surfaces 10a of positioning projections 10 at the top edges 10H of the latter where a relatively small effective diameter is defined.

However, it is to be noted that, in accordance with the relevant standards, the upper margin 4H (FIG. 2) of the cylindrical peripheral surface 4a, that is, the line of demarcation between cylindrical peripheral surface 44a and a frusto-conical upper end portion 4b provided on the spindle, is a distance $h_1 = 0.3 \pm 0.2$ mm above an annular seating surface 12 provided on the disc drive unit around spindle 4 in a plane o normal to the central rotary axis of the cylindrical peripheral surface 4a of the spindle. With the foregoing standardized dimensions, the distance $h_1$ from the upper margin 4H of cylindrical surface 4a of the spindle to the plane o of seating surface 12 may be as small as 0.1 mm. Therefore, when the top edges 10H of positioning projections 10 are at a distance $h_2 > 0.1$ mm above a reference surface 13 defined by the underside of yoke 7, as is possible in the prior flexible magnetic disc apparatus, a problem arises in respect to achieving concentric alignment of the magnetic disc 1 with the axis of rotation of spindle 4. More specifically, when $h_2$ is greater than 0.1 mm and $h_1$ is at its minimum value of 0.1 mm, the engagement of reference surface 13 on seating surface 12 causes the top edges 10H of positioning projections 10 to be disposed above the upper margin 4H of cylindrical peripheral surface 4a of the spindle, as shown on FIG. 2. In such case, the upper margin 4H of peripheral surface 4a engages the tapering or inclined operative surfaces 10a of projections 10 below the top edges 10H of the latter. Thus, the effective diameter of aperture 9 at the level of the engagement of surface 4a with projections 10 is larger than the effective diameter established at the top edges 10H and, accordingly, the center of rotation of magnetic disc 1 is not precisely coincident with the axis of spindle 4.

In order to avoid the foregoing problem, in a flexible magnetic disc apparatus embodying the present invention, as shown on FIGS. 3-6, the top edges 10H of the spindle positioning projections 10 are located in respect to the reference surface 13 at the underside of yoke 7 so that, when the record disc is mounted on the disc drive unit with the reference surface 13 engaging the seating surface 12, the upper margin 4H of the cylindrical peripheral surface 4a of the spindle will always be disposed above the top edges 10H of the positioning projections 10, notwithstanding the previously mentioned standard dimensions and tolerances thereof, for ensuring that the positioning projections 10 will always accurately center the flexible magnetic disc member 1 relative to the rotary axis of spindle 4.

Figure 3:
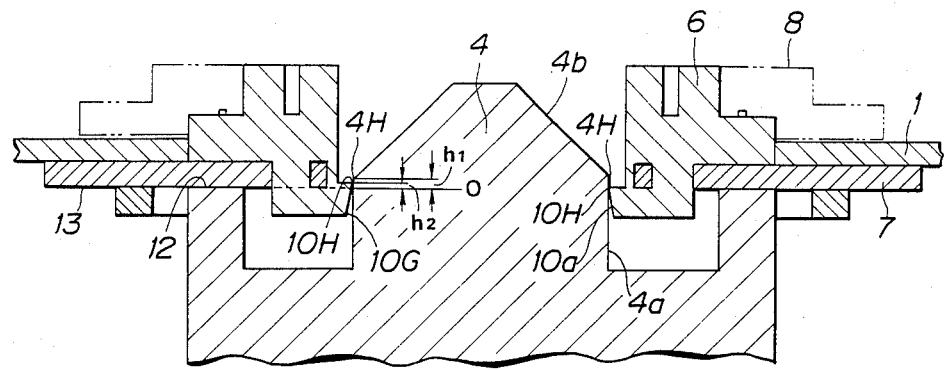
FIG. 3 is an enlarged section view similar to that of FIG. 2, but illustrating an embodiment of the present invention.
Figure 4:
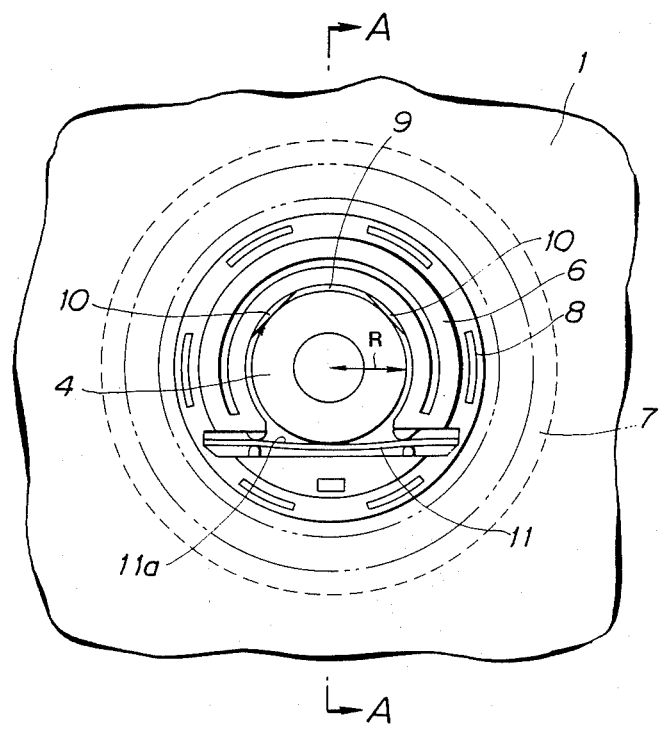
FIG. 4 is an enlarged fragmentary plan view showing essential parts of a reinforcing core member included in the flexible magnetic disc apparatus according to this invention.
Figure 5:
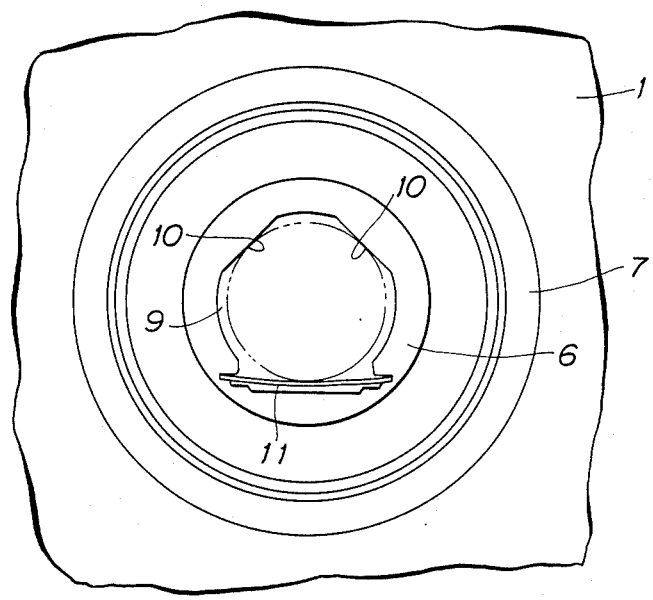
FIG. 5 is an enlarged fragmentary plan view similar to that of FIG. 4, but showing the flexible magnetic disc apparatus as viewed from the opposite side thereof.
Figure 6:
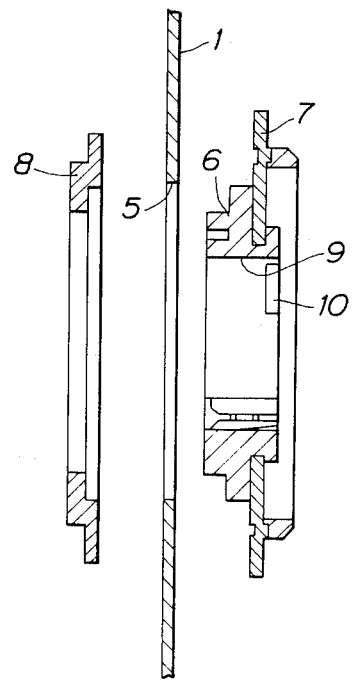
FIG. 6 is an exploded fragmentary sectional view taken along the line A—A on FIG. 4.

More particularly, and as shown in detail on FIG. 3, in accordance with the present invention, the distance $h_2$ that the top edges 10H of positioning projections 10 are above the reference surface 13 at the underside of yoke 7 is made smaller than the minimum value of the distance $h_1$ that the upper margin 4H of surface 4a is above the seating surface 12, taking into account the standardized dimensional tolerances or possible variations. Thus, in the previous example in which the distance $h_1$ is $0.3 \pm 0.2$ mm, so that the minimum value of the distance $h_1$ is 0.1 mm, the distance $h_2$ of the top edges 10H above the reference surface 13 is made to be less than 0.1 mm, for example, is given a value of 0.05 mm. By reason of the foregoing, when the record disc is mounted on the disc drive unit in a flexible magnetic disc apparatus according to this invention, the cylindrical peripheral surface 4a of spindle 4 always engages positioning projections 10 at the top edges 10H of the latter so that the flexible magnetic disc member 1 is thereby accurately centered in respect to the axis of rotation of the spindle.

Although an illustrative embodiment of this invention has been described in detail herein with reference to the accompanying drawings, it is to be understood that the invention is not limited to that precise embodiment, and that various changes and modifications could be effected therein by one skilled in the art without departing from the scope or spirit of the invention as defined in the appended claims.

What is claimed is:

1. In combination with a disc drive unit including a spindle with a cylindrical peripheral surface leading at an upper margin thereof to a frusto-conical end portion and a seating surface provided on said disc drive unit in a plane normal to the center rotary axis of said cylindrical peripheral surface; a record disc including a flexible magnetic disc member, a molded core member of synthetic resin secured to said disc member at the the center of the latter and having an aperture for receiving said spindle, a circular metal yoke having openings through which said core member is molded and defining a reference surface engageable with said seating surface to limit the extension of said spindle through said aperture, and centering means associated with said core member including spindle positioning projections molded integrally with said core member and extending into said aperture for engagement with said spindle therein and a resilient member extending into said aperture for pressing said spindle therein against said positioning projections, said positioning projections having faces inclined back from top edges of said positioning projections, said top edges located in respect to said reference surface so that, when said record disc is mounted on said disc drive unit with said reference surface engaging said seating surface, said cylindrical peripheral surface of the spindle always extends above said top edges of the positioning projections for ensuring that the latter accurately center said flexible magnetic disc member relative to said rotary axis.

2. The combination according to claim 1 in which there are two of said spindle positioning projections having said faces converging and engageable at said top edges by said cylindrical peripheral surface of the spindle.

3. The combination according to claim 1; in which said upper margin of the peripheral surface is at least a predetermined minimum distance above said plane of the seating surface, and said top edges of the positioning projections are at a distance above said reference surface that is substantially smaller than said predetermined minimum distance from said plane of the seating surface to said upper margin of the cylindrical peripheral surface on the spindle.

4. The combination according to claim 3; in which said distance of said top edges above said reference surface is less than 0.1 millimeters.

* * * * *